United States Patent
Combs et al.

(10) Patent No.: US 11,243,324 B2
(45) Date of Patent: Feb. 8, 2022

(54) FORMATION RESISTIVITY EVALUATION SYSTEM

(71) Applicant: Halliburton Energy Services, Inc., Houston, TX (US)

(72) Inventors: Jeremy James Combs, Spring, TX (US); Nigel Clegg, Norfolk (GB); Renata Da Gama Saintive, Houston, TX (US); Vytauias Usaitis, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/770,866

(22) PCT Filed: Mar. 12, 2018

(86) PCT No.: PCT/US2018/022028
§ 371 (c)(1),
(2) Date: Jun. 8, 2020

(87) PCT Pub. No.: WO2019/177574
PCT Pub. Date: Sep. 19, 2019

(65) Prior Publication Data
US 2021/0165120 A1    Jun. 3, 2021

(51) Int. Cl.
*G01V 3/18* (2006.01)
*G01V 3/20* (2006.01)
(Continued)

(52) U.S. Cl.
CPC ............... *G01V 3/20* (2013.01); *E21B 49/00* (2013.01); *G01V 3/38* (2013.01)

(58) Field of Classification Search
CPC ............. G01V 3/20; G01V 3/38; E21B 49/00
See application file for complete search history.

(56) References Cited

U.S. PATENT DOCUMENTS

| 3,034,042 A | 5/1962 | Slack et al. |
| 5,038,108 A * | 8/1991 | Lessi ................... G01V 3/20 324/355 |

(Continued)

FOREIGN PATENT DOCUMENTS

WO    2009140181 A1    11/2009

OTHER PUBLICATIONS

International Search Report and Written Opinion dated Jan. 14, 2019, International PCT Application No. PCT/US2018/022028.

*Primary Examiner* — Alesa Allgood
(74) *Attorney, Agent, or Firm* — McGuireWoods LLP

(57) ABSTRACT

The disclosed embodiments include systems and methods to evaluate formation resistivity. In one embodiment, a method to evaluate formation resistivity proximate a wellbore is provided. The methods includes receiving data indicative of resistivity measurements of a formation proximate a wellbore at different distances within a range of distances from the wellbore. The method also includes analyzing the data to determine approximate formation resistivity of the formation at different distances from the wellbore. The method further includes generating at least one curve, each indicative of an approximate formation resistivity of the formation at the different distances from the wellbore, overlaying the at least one curve on a graph indicative of the formation resistivity of the formation within the range of distances from the wellbore, and providing the at least one curve overlaid on the graph for display on a device.

17 Claims, 5 Drawing Sheets

(51) Int. Cl.
 *E21B 49/00* (2006.01)
 *G01V 3/38* (2006.01)

(56) References Cited

U.S. PATENT DOCUMENTS

| | | |
|---|---|---|
| 2006/0195264 A1 | 8/2006 | Galil El Askary |
| 2012/0191364 A1 | 7/2012 | Caycedo |
| 2016/0223702 A1* | 8/2016 | Hou .......................... G01V 3/38 |
| 2016/0282512 A1* | 9/2016 | Donderici ............... E21B 43/26 |

* cited by examiner

FORMATION RESISTIVITY EVALUATION SYSTEM

BACKGROUND

The present disclosure relates generally to systems and methods to evaluate formation resistivity of a formation proximate a wellbore.

Data indicative of formation resistivity are often gathered during preparation, drilling, and production stages of a hydrocarbon well. The data is analyzed to determine material properties of the formation proximate a wellbore, the location of hydrocarbon resources proximate the wellbore, the location of other fluids in the formation, the well path of the wellbore, as well as other quantitative information about the wellbore and the formation proximate the wellbore.

Models are sometimes generated based on data indicative of the formation resistivity to assist operators to quantitatively analyze the formation. For example, certain models display the formation resistivity of a formation in a color smear, where different colors of the color smear represent different measurements of resistivity at different distances from the wellbore. However, these models can be somewhat limited in terms of providing all of the information necessary for operators to analyze a formation, and may also convey limited quantitative information.

BRIEF DESCRIPTION OF THE DRAWINGS

Illustrative embodiments of the present disclosure are described in detail below with reference to the attached drawing figures, which are incorporated by reference herein, and wherein.

Figure 1A:
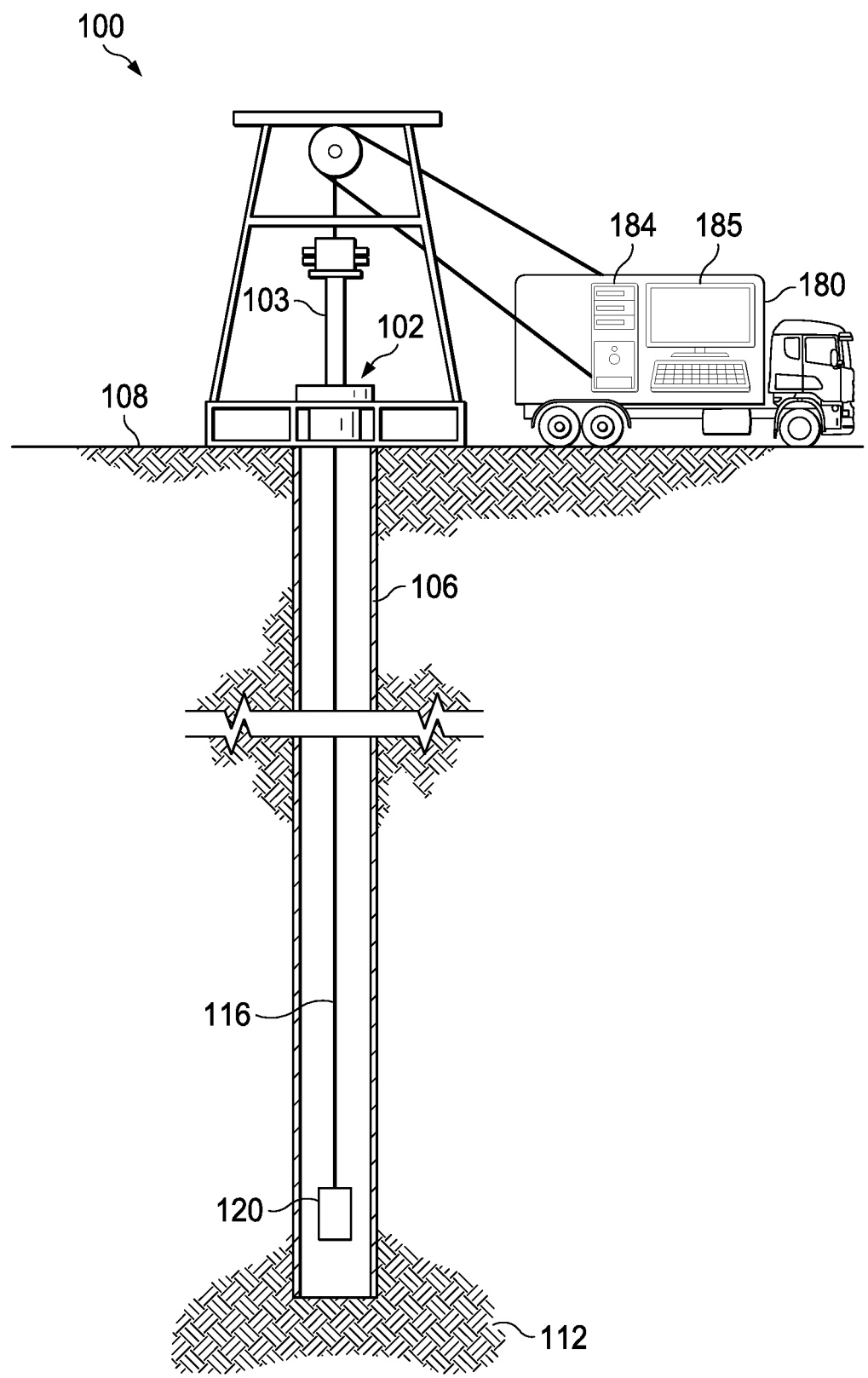
FIG. 1A is a schematic, side view of a wireline environment, where measurements of the formation resistivity are obtained, and where curves indicative of formation resistivity of the formation are generated based on the measurements, and are displayed on a display.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to evaluate formation resistivity. More particularly, the present disclosure relates to systems and methods to generate curves, each curve indicative of an approximate formation resistivity within a range of distances from a wellbore, and displaying the curves overlaid on a graph that is indicative of the formation resistivity within the range of distances from the wellbore (formation resistivity graph). The system receives data indicative of resistivity measurements of the formation. In some embodiments, the resistivity measurements are obtained from a downhole sensor that detects the resistivity of the formation. In other embodiments, the resistivity measurements represent historical values of measurements of the formation resistivity and stored in a storage medium accessible by the system. In further embodiments, the resistivity measurements represent measurements of a formation proximate a nearby wellbore.

The system analyzes the data to determine approximate formation resistivity at different distances from the wellbore. In some embodiments, an approximate formation resistivity at a distance from the wellbore represents an approximate certainty of a threshold resistivity at the distance from the wellbore. For example, if 10% of a distribution of results at 10 feet away from the wellbore is 1 ohm, then the certainty of formation resistivity value at 10 feet is 1 ohm is 10%. The system determines the approximate formation resistivity at different distances from the wellbore. The system then generates a curve along the formation resistivity graph over a range of distances from the wellbore, where the curve represents a specific approximation of the formation resistivity over the range of distances from the wellbore. For example, where the formation resistivity graph has a first axis (x-axis) that represents threshold formation resistivity measured in ohms, and a second axis (y-axis) that represents the distance from the wellbore (such as measured in feet), each point on the formation resistivity graph represents a threshold formation resistivity at a specific distance from the wellbore. The system forms a curve that is indicative of the approximate formation resistivity of the formation at the different distances from the wellbore from different points on the formation resistivity graph. The system is capable of generating multiple curves on the formation resistivity graph, where each curve is indicative of a different approximation of formation resistivity of the formation within the range of distances. The system overlays the generated curves on the formation resistivity graph and displays the formation resistivity graph on a display of an electronic device. Additional descriptions of displaying one or more curves on the formation resistivity graph are described in the paragraphs below and are illustrated in at least FIG. 3.

The formation resistivity graph allows an operator analyzing said graph on the display to quickly ascertain the likelihood of the formation resistivity at different distances from the wellbore. In some embodiments, the operator may compare and contrast deviations between two or more curves to determine the quality of the data used to determine the formation resistivity. In one of such embodiments, the operator may compare curvatures of a first curve (e.g., curvatures of the first curve at 10-20 feet away from the wellbore) to corresponding curvatures of a second curve (e.g., curvatures of the second curve at 10-20 feet away from the wellbore) to determine the quality of the data. In such embodiments, if corresponding curvatures of the first and the second curves significantly deviate, then the operator may quickly ascertain that the data used to determine the formation resistivity is poor and new data should be obtained. In another one of such embodiments, the operator may determine a value of the threshold formation resistivity at a specific point on the first curve (e.g., 20 feet away from the wellbore) and determine a value of the threshold formation resistivity as a corresponding point (e.g., 20 feet away from the wellbore) to determine the quality of the data. In such embodiments, the operator may determine the quality of the data based on the deviation of the threshold formation resistivity at the corresponding points of the first and the second curves.

In some embodiments, the system is operable of dynamically analyzing the quality of the data by comparing corresponding curvatures of different curves or comparing the values of the formation resistivity at corresponding points on the different curves. In one of such embodiments, the system, upon determining that corresponding curvatures of different curves or the values of the formation resistivity at corresponding points on the different curves vary by more than a deviation threshold, the system dynamically generates a notification that the quality of the data is unacceptable, and displays the notification on the display. In such embodiments, the deviation threshold is any quantifiable value provided by the operator.

In some embodiments, the system generates an offset curve, where the offset curve is indicative of the formation resistivity of a formation at different distances from an offset wellbore. As defined herein, an offsite well is another well within a threshold distance from the well at issue. In one of such embodiments, the system is operable of performing the above-described operations to compare the curve indicative of the formation resistivity of the offset well with one or more curves indicative of the formation properties of the well at issue to determine the quality of the data. In other embodiments, the curve indicative of the formation resistivity of the offset well is displayed together with the one or more curves indicative of the formation properties of the well at issue to allow the operator to compare and contrast the formation resistivity of the offset well with the formation resistivity of the well at issue.

In some embodiments, the system assigns a different color to each curve overlaid on the formation resistivity graph to help an operator to differentiate the different curves. In further embodiments, the system fills an area between two overlaid curves with a color and displays the filled area in the color on the display. Additional descriptions of the foregoing systems and methods to evaluate formation resistivity are described in the paragraphs below and are illustrated in FIGS. 1-4.

Turning now to the figures, FIG. 1A is a schematic, side view of a wireline environment 100 with a resistivity sensor 120, deployed in a borehole 106 to measure the formation resistivity of a formation 112 surrounding borehole 106. FIG. 1A may also represent another completion or preparation environment where a wireline operation is performed. In the embodiment of FIG. 1A, a well 102 having borehole 106 extends from a surface 108 of well 102 to or through a formation 112. A vehicle 180 carrying a wireline 116 is positioned proximate to the well 102. Wireline 116 along with resistivity sensor 120 are lowered through a blowout preventer 103 down borehole 106.

Resistivity sensor 120 represents any sensor operable to measure formation resistivity of formation 112. In some embodiments, resistivity sensor 120 also represents sensors operable of obtaining measurements indicative of the conductivity, permeability, as well as other formation properties of formation 112. In other embodiments, resistivity sensor 120 is a component of a downhole tool (not shown) deployed in borehole 106. In one some embodiments, the downhole tool also includes other types of sensors and are also operable of measuring electromagnetic radiations (such as gamma ray radiations, x-ray radiations, as well as other types of electromagnetic radiations) emitted by formation 112 or emitted by materials deployed in borehole 106. In further embodiments, downhole tool represents other types of tools operable of measuring other formation properties (such as, but not limited to, formation density and formation porosity) of formation 112. Resistivity sensor 120 is communicatively connected to controller 184 via a telemetry system (not shown) and is operable to provide as data indicative of the formation resistivity of formation 112 to controller 184. Controller 184 represents any electronic device having hardware and software components operable of analyzing the data to determine approximate formation resistivity of formation 112 the different distances from the wellbore, generating a formation resistivity graph within a range of distances from the wellbore, and overlaying the formation resistivity graph with curves, where each curve is indicative of an approximate formation resistivity of the formation at the different distances. Examples of controller 184 include, but are not limited to, desktop computers, laptop computers, server computers, work stations, tablet computers, smartphones, PDAs, as well as other electronic devices operable of performing the foregoing operations to generate one or more curves overlaid on the formation resistivity graph, where each curve is indicative of an approximate formation resistivity of the formation at the different distances. In the depicted embodiment, controller 184 is communicatively connected to display 185 and is operable of providing the curves overlaid on the formation resistivity graph for display on display 185. As described herein, controller 184 is operable of overlaying multiple curves, each indicative of a different threshold of the formation resistivity, on the formation resistivity graph.

An operator may then view the formation resistivity graph on display 185 and may analyze the formation resistivity graph to determine the formation resistivity of formation 112. In some embodiments, the operator may input different desired formation resistivity. For example, where the formation resistivity graph includes a first curve indicative of a 5% of the threshold formation resistivity and a second curve is indicative of a 95% of the formation resistivity, the operator may enter different desired thresholds of the formation resistivity. In one of such embodiments, controller 184, upon receipt of a first desired formation resistivity and a second desired formation resistivity, revises the curvatures of the first curve and the second curve to indicate the first desired formation resistivity and the second desired formation resistivity, respectively. In other embodiments, controller 184 generates new curves indicative of the first desired and the second desired formation resistivity. In some embodiments, controller 184 is also operable of performing operations described herein to analyze deviations between different curves and to generate a notification about the quality of the data obtained by resistivity sensor 120 on display 185. The operator may request resistivity sensor 120 to make new measurements indicative of the formation resistivity of formation 112. In some embodiments, controller 184, upon determining that the deviations between two generated curves is greater than a deviation threshold, dynamically instructs resistivity sensor 120 to obtain new measurements of the formation resistivity of formation 112. In such embodiments, controller 184 is operable of generating, based on data indicative of the new measurements, replacement curves, each indicative of an approximate formation resistivity of the formation, overlay the replacement curves on the formation resistivity graph, and provide the formation resistivity graph having the replacement curves for display on display 185.

Figure 1B:
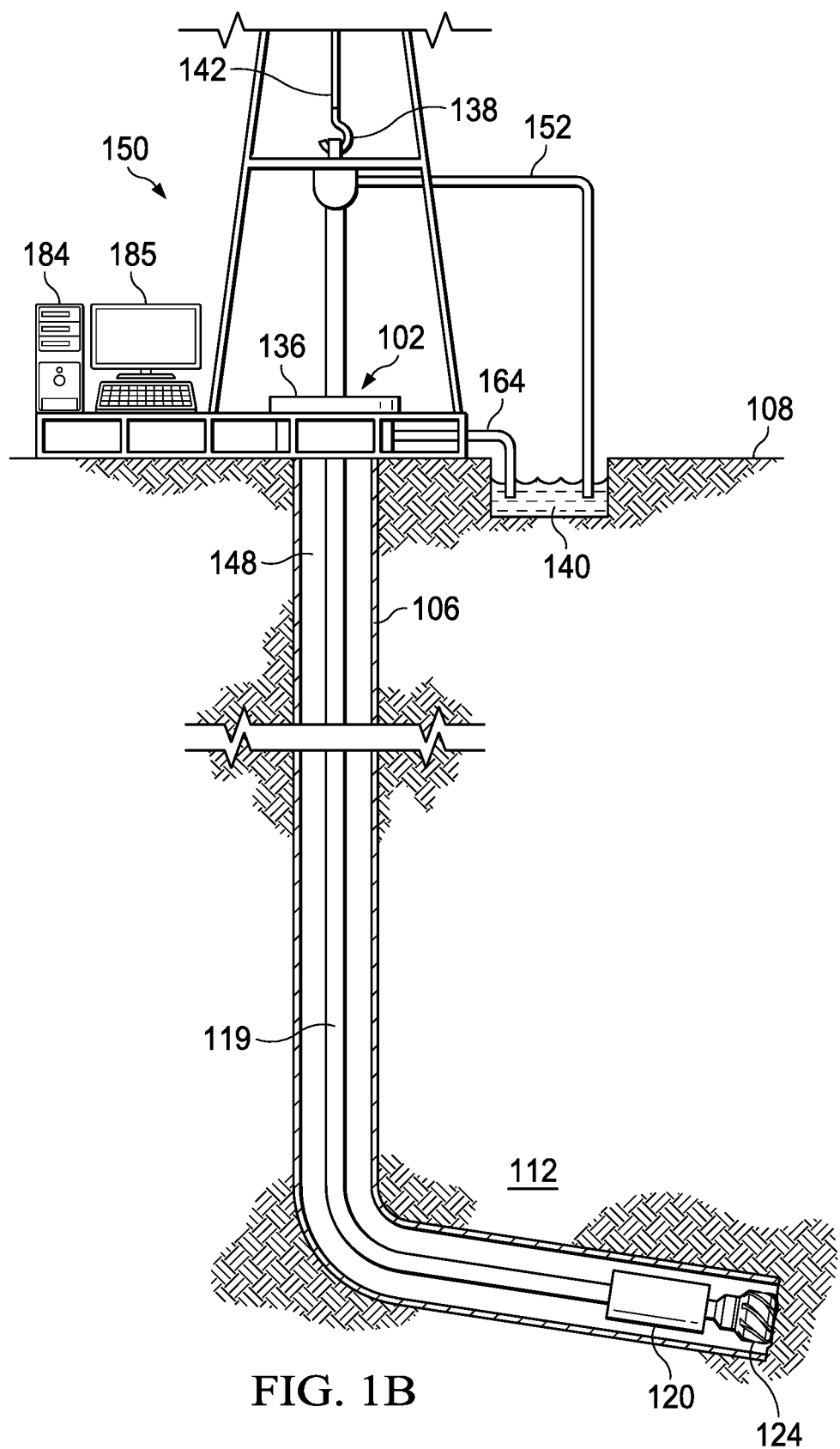
FIG. 1B is a schematic, side view of a logging while drilling (LWD)/measurement while drilling (MWD) environment where measurements of the formation resistivity are obtained during MWD/LWD operations, and where curves indicative of formation resistivity of the formation are generated based on the measurements, and are displayed on a display.

FIG. 1B is a schematic, side view of a LWD/MWD environment 150 with resistivity sensor 120 deployed to measure the properties of formation 112 during a drilling operation. FIG. 1B may also represent another completion or preparation environment where a drilling operation is performed. A hook 138, cable 142, traveling block (not shown), and hoist (not shown) are provided to lower a conveyance 119 down borehole 106 or to lift conveyance 119 up from borehole 106. In some embodiments, conveyance 119 may be wireline, slickline, coiled tubing, drill pipe, production tubing, downhole tractor or another type of conveyance operable to deploy resistivity sensor 120.

At wellhead 136, an inlet conduit 152 is coupled to a fluid source (not shown) to provide fluids, such as drilling fluids, downhole. Conveyance 119 has an internal cavity that provides a fluid flow path from the surface 108 down to resistivity sensor 120. In some embodiments, the fluids travel down conveyance 119, through resistivity sensor 120, and exit conveyance 119 at the drill bit 124. The fluids flow back towards the surface 108 through a wellbore annulus 148 and exit wellbore annulus 148 via an outlet conduit 164 where the fluids are captured in container 140.

Although FIGS. 1A and 1B each illustrates a surface based controller, in some embodiments, controller 184 is deployed in a downhole location, such as along the wireline 116 in FIG. 1A. In such embodiments, controller 184 is operable of providing the generated formation resistivity graph having one or more curves described herein to display 185 via telemetry. Further, although FIGS. 1A and 1B each illustrates a single resistivity sensor 120 deployed in borehole 106, multiple resistivity sensors, such as resistivity sensor 120 may be simultaneously deployed in borehole 106 to simultaneously obtain measurements of the formation resistivity at different depths.

Figure 2:
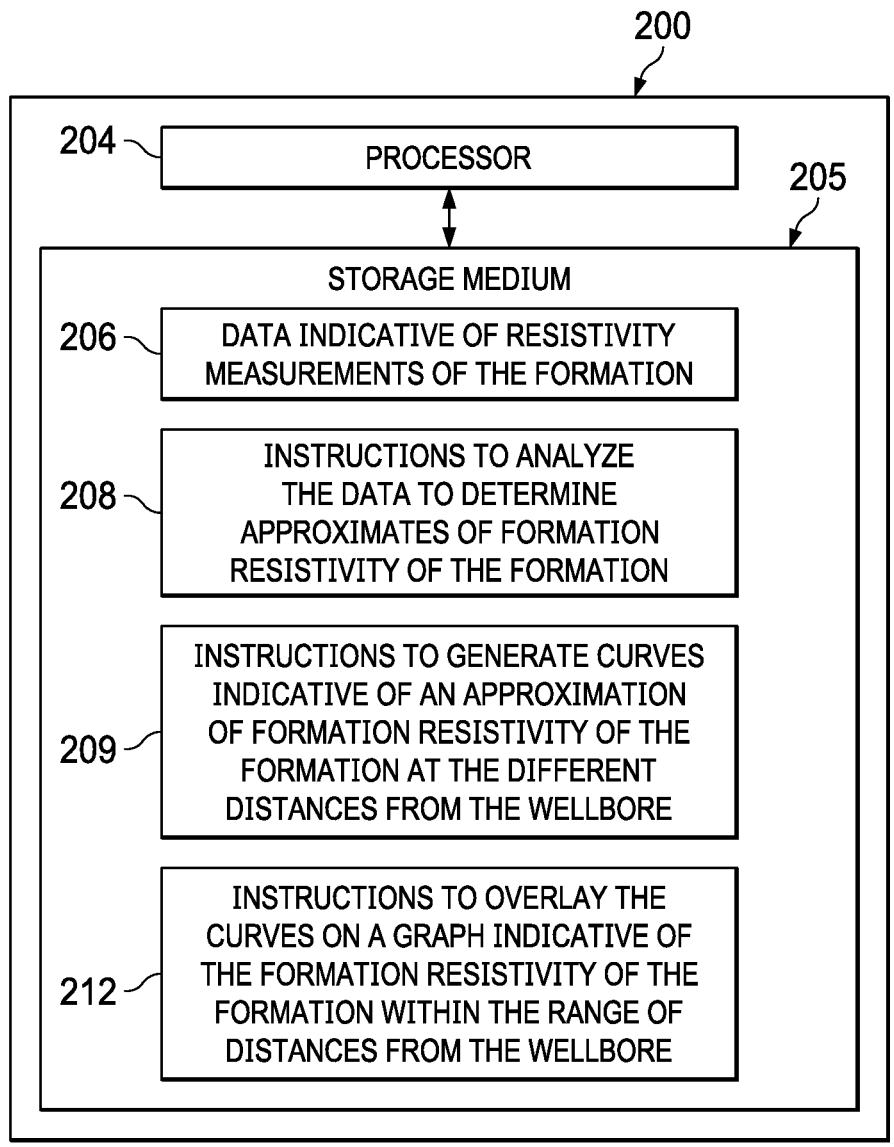
FIG. 2 is a block diagram of a formation resistivity evaluation system deployable in the wireline environment of FIG. 1A and in the LWD/MWD environment of FIG. 1B.

FIG. 2 is a block diagram of a formation resistivity evaluation system 200 that is deployable in the wireline environment of FIG. 1A and in the LWD/MWD environment of FIG. 1B. The formation resistivity evaluation system 200 includes a storage medium 205 and a processor 204. Storage medium 205 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, storage medium 205 includes multiple data storage devices. In further embodiments, the multiple data storage devices may be physically stored at different locations. External data, such as data indicative of measurements obtained from resistivity sensor 120 shown in FIGS. 1A and 1B, are transmitted to the formation resistivity evaluation system 200 and is stored at a first location 206 of storage medium 205. In some embodiments, external data also includes data indicative of the formation resistivity of the offset wellbores proximate the wellbore at issue are also stored at first location 206. In further embodiments, historical data indicative of previous measurements made by resistivity sensor 120, made by other downhole sensors, or obtained from other electronic devices are also stored at first location 206.

As shown in FIG. 2, instructions to analyze the external data to determine approximations of the formation resistivity are stored at a second location 208 of storage medium 205, instructions to generate curves indicative of approximates of formation resistivity of formation 112 at the different distances from borehole 106 are stored at a third location 209 of storage medium 205, and instructions to overlay the curves on a graph indicative of the formation resistivity of the formation within the range of distances from the wellbore, such as the formation resistivity graph described herein are stored at a fourth location 210 of storage medium 205. The instructions to perform other operations described herein are also stored in storage medium 205.

In some embodiments, formation resistivity evaluation system 200 contains additional components used to evaluate formation properties of the downhole formation. For example, in some embodiments, formation resistivity evaluation system 200 also includes resistivity sensor 120 of FIGS. 1A and 1B as well as other downhole sensors used to obtain data indicative of the formation resistivity of formation 112. In other embodiments, where resistivity sensor 120 is a component of a downhole tool, formation resistivity evaluation system 200 also includes the downhole tool, as well as other tools deployed in borehole 106 (such as drill bit 124) that are deployed in borehole 106 during one or more operations described herein. In other embodiments, formation resistivity evaluation system 200 also includes telemetry systems described in FIGS. 1A and 1B, or other telemetry systems operable to transmit data between tools 120 and 121 of FIGS. 1A and 1B and controller 184. In further embodiments, formation resistivity evaluation system 200 also includes conveyance 119 of FIG. 1A and wire line 116 of FIG. 1B, which are used to deploy resistivity sensor 120 downhole. In one or more of such embodiments, formation resistivity evaluation system 200 also includes transmitters, receivers, transceivers, as well as other components used to transmit data between resistivity sensor 120 and controller 184. In some embodiments, memory 205 also contain instructions to evaluate other types of formation properties, such as, but not limited to, formation porosity, formation density, and electrometric radiations emitted from formation 112. In such embodiments, processor 204 is operable to perform operations described herein to generate volumetric renderings of different types of formation properties of formation 112 and provide the generated volumetric renderings for display on controller 184. Addition description of operations performed by processor 204 to generate volumetric renderings of different types of formation properties are provided in the paragraphs below.

Figure 3:
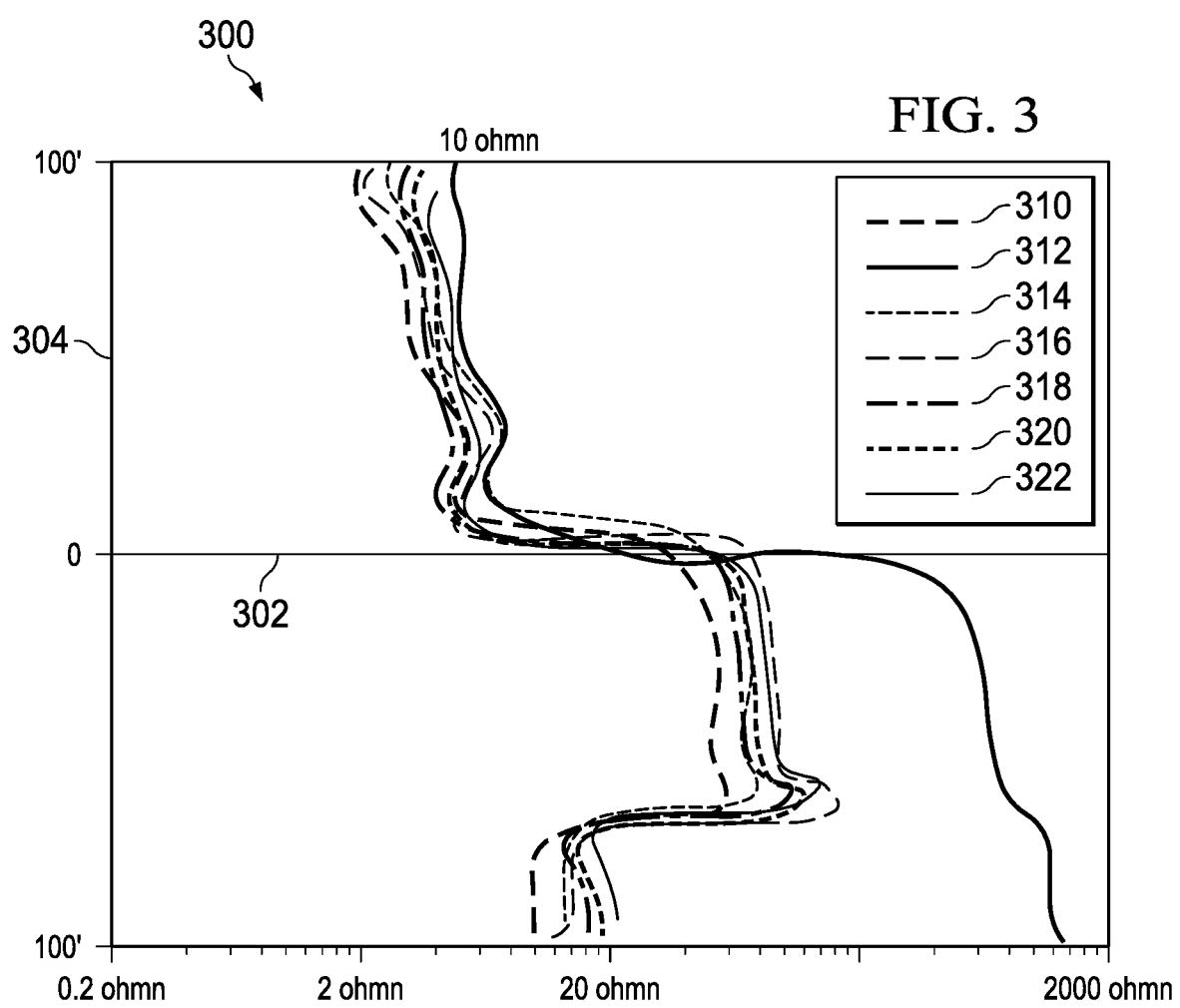
FIG. 3 is a formation resistivity graph indicative of the formation resistivity of the formation at different distances of the wellbore, where multiple curves, each indicative of an approximate formation resistivity of the formation at the different distances from the wellbore, are overlaid on the graph.

FIG. 3 is a formation resistivity graph 300 indicative of the formation resistivity of formation 112 at different distances of borehole 106, where multiple curves, each indicative of an approximation of formation resistivity of the formation at the different distances from borehole 106, are overlaid on the formation resistivity graph 300. Axis 302 represents a logarithmic scale of the threshold formation resistivity measured in ohmms, and axis 304 represents the distance from borehole 106, where 0 represents the location of the wellbore, values above axis 304 represent distances from locations above borehole 106, and where negative values along axis 304 represent distances from locations below borehole 106. Several curves are generated by the formation resistivity evaluation system and are overlaid on the formation resistivity graph 300. The processes for generating curves are described herein.

In certain embodiments, the processor also analyzes the data to determine certainties of formation resistivity of the formation at different distances from the wellbore. As described herein, a certainty of the formation resistivity at a distance from the wellbore is an indication of a certainty of a threshold resistivity of the formation at the distance from the wellbore. As depicted in FIG. 3, the formation resistivity graph 300 includes a first curve 310 that represents a 5% certainty of the threshold formation resistivity of the formation from 100 feet above borehole 106 to 100 feet below borehole 106. More particularly, first curve 310 indicates that there is a 5% certainty that the threshold formation resistivity at a distance of 100 feet above borehole 106 is 2 ohmm, whereas there is a 5% certainty that the threshold formation resistivity at a distance of 100 feet below borehole 106 is 20 ohmm. Second curve 312 represents a 95% certainty of the threshold formation resistivity of the formation from 100 feet above borehole 106 to 100 feet below the wellbore. More particularly, second curve 312 indicates that there is a 95% certainty that the threshold formation resistivity at a distance of 100 feet above borehole 106 is 10 ohmm, whereas there is a 95% certainty that the threshold formation resistivity at a distance of 100 feet below borehole 106 is 2,000 ohmm. Further, a third curve 314 indicative of the average of the resistivity measurements of the formation from 100 feet above borehole 106 to 100 feet below borehole 106 is also overlaid on the formation resistivity graph 300. Further, a fourth curve 316 indicative of a 50% certainty that the threshold formation at a distance of 100 feet above borehole 106 to 100 feet below borehole 106 is also overlaid on the formation resistivity graph 300. Further, a fifth curve 318 and a sixth curve 320, representing the formation resistivity of a first offset well and a second offset well from a distance of 100 feet above the respective well to a distance of 100 feet below the respective well are also overlaid on the formation resistivity graph 300. Further, a seventh curve 322 indicative of real time measurements of the formation resistivity of borehole 106 from 100 feet above borehole 106 to 100 feet below borehole 106 is also overlaid on the formation resistivity graph 300.

As depicted, each curve is displayed in a different color to help the operator to identify different curves and to compare different curves. In some embodiments, areas between two curves are color filled. In further embodiments, each point along a curve is selectable by the operator. Although the depicted formation resistivity graph 300 depicts seven curves, a different number of curves representing a different number of approximates of the formation resistivity and the formation resistivity of a different number of offsite wells may be displayed on the formation resistivity graph 300.

Figure 4:
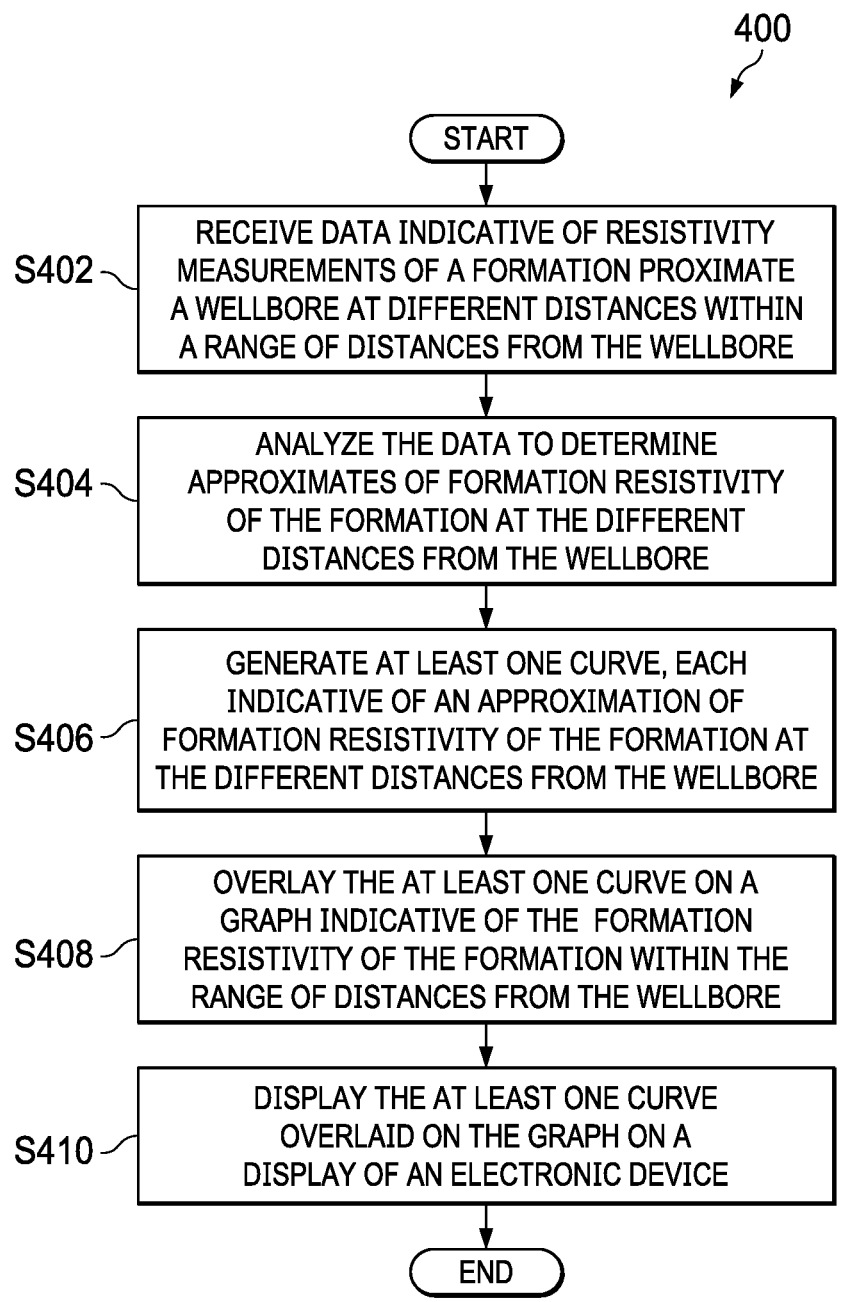
FIG. 4 is a flow chart of a process to evaluate formation resistivity.

FIG. 4 is a flow chart of a process 400 to evaluate formation resistivity. Although the operations in the process 400 are shown in a particular sequence, certain operations may be performed in different sequences or at the same time where feasible.

As described below, process 400 provides an intuitive way for evaluating formation resistivity of a downhole formation proximate a wellbore, such as formation 112 of FIGS. 1A and 1B. The process provides an operator with curvatures indicative of formation resistivity of the downhole formation at different distances from the wellbore, thereby allowing the operator to make informed decisions during different stages of hydrocarbon production. The process also allows the operator to compare different curvatures indicative of different thresholds of formation resistivity at different distances. In some embodiments, the process also allows the operator to compare curvatures indicative of formation resistivity of formation 112 with the formation resistivity of formations in nearby wells. In certain embodiments, the process also allows the operator to assign different colors to different curvatures, thereby helping the operator distinguish different curvatures. In certain operations, such as preparation and drilling operators, where data used to generate the curvatures indicative of formation resistivity are provided in real-time or close to real-time, the process allows the operator to quickly analyze the resistivity of the downhole formation and to make real-time decisions, such as how and where to steer a drill bit to avoid certain boundaries. The foregoing allows the operator to make informed real-time adjustments to correct human and machine errors, thereby reducing the financial costs as well as safety hazards attributed to such errors.

A processor of a formation resistivity evaluation system, such as formation resistivity evaluation system 200 of FIG. 2, receives, at block 5402, data indicative of measurements of a formation, such as formation 112 of FIGS. 1A and 1B at different distances within a range of distances from a wellbore. In the depicted embodiments of FIGS. 1A and 1B, measurements of the formation resistivity are made by resistivity sensor 120. In other embodiments, data indicative of the measurements of formation 112 are historical data stored on a storage medium such as storage medium 205 of FIG. 2.

At block 5404, the processor analyzes the data to determine approximations of formation resistivity of the formation at the different distances from the wellbore. In certain embodiments, the processor also analyzes the data to determine certainties of formation resistivity of the formation at different distances from the wellbore. For example, in the depicted embodiment of FIG. 3, 5%, 50%, and 95% certainties of the threshold resistivity of the formation are determined from a distance of 100 feet above borehole 106 to 100 feet below borehole 106. In some embodiments, where the operator specifies a desired certainty, the processor analyzes the data to determine the desired certainty of the threshold resistivity of the formation.

At block 5406, the processor generates at least one curve, where each curve of the at least one curve is indicative of an approximation of formation resistivity of the formation at the different distances from borehole 106. In some embodiments, the processor is further operable of assigning a different color to each curve. In some embodiments, where the formation resistivity has access to data indicative of formation resistivity of offset wells, the processor is also operable of generating curves indicative of the formation resistivity of the offset wells.

At block 5408, the processor overlays each curve of the at least one curve on a graph indicative of the formation resistivity of the formation, such as the formation resistivity graph 300. In some embodiments, the processor also color fills an area between two different curves to facilitate an operator to identify the area. At block 5410, the processor displays the at least one curve on a display of an electronic device, such as display 185 of FIGS. 1A and 1B. In some embodiments, the processor also assesses the quality of the data used to generate different curves indicative of different approximates of the formation resistivity. In one of such embodiments, the processor determines deviations between a first curve and a second curve and determines the quality of the data used to generate both curves based on an amount of deviations between the first curve and the second curve. In one of such embodiments, the processor determines, at a first point along the first curve, a first value of the formation resistivity at a first distance from the wellbore and determines at a corresponding point along the second curve, a second value of the formation resistivity at the first distance from the wellbore. The processor then determines the difference between the first value and the second value, and determines the amount of deviation between the first curve and the second curve based on the difference between the first value and the second value. In one of such embodiments, if the processor determines that the amount of deviation between the first curve and the second curve is greater than a deviation threshold, then the processor generates a notification that the quality of the data is unacceptable and displays the notification on display 185 in FIGS. 1A and 1B.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a method to evaluate formation resistivity, the method comprising: receiving data indicative of resistivity measurements of a formation proximate a wellbore at different distances within a range of distances from the wellbore; analyzing the data to determine approximate formation resistivity of the formation at the different distances from the wellbore, each indicative of an approximate formation resistivity of the formation at the different distances from the wellbore; overlaying the at least one curve on a graph indicative of the formation resistivity of the formation within the range of distances from the wellbore; and providing the at least one curve overlaid on the graph for display on a display of an electronic device.

Clause 2, the method of clause 1, wherein generating the at least one curve comprises: generating a first curve indicative of a first threshold of the formation resistivity; and generating a second curve indicative of a second threshold of the formation resistivity.

Clause 3, the method of clause 1 or 2, further comprising determining an amount of deviation between the first curve and the second curve; and determining a quality of the data based on the amount of deviation between the first curve and the second curve.

Clause 4, the method of at least one of clauses 1-3, wherein determining the amount of deviation between the first curve and the second curve comprises comparing differences between at least one curvature of the first curve and at least one corresponding curvature of the second curve.

Clause 5, the method of at least one of clauses 1-4, determining, at a first point along the first curve, a first value of the formation resistivity at a first distance from the wellbore; and determining, at a corresponding point along the second curve, a second value of the formation resistivity at the first distance from the wellbore, wherein determining the amount of deviation between the first curve and the second curve comprises determining a difference between the first value of the formation resistivity and the second value of the formation resistivity.

Clause 6, the method of at least one of clauses 1-5, further comprising: determining if the amount of deviation between the first curve and the second curve is greater than a deviation threshold; in response to determining that the amount of deviation between the first curve and the second curve is greater than the deviation threshold, generating a notification that the quality of the data is unacceptable; and providing the notification for display on the display of the electronic device.

Clause 7, the method of at least one of clauses 1-6, further comprising: receiving a first desired formation resistivity and a second desired formation resistivity; designating the first desired formation resistivity as the first threshold of the formation resistivity; and designating the second desired formation resistivity as the second threshold of the formation resistivity.

Clause 8, the method of at least one of clauses 1-7, further comprising: filling an area on the graph in between the first curve and the second curve with a first color; and providing the area having the first color for display on the display of the electronic device.

Clause 9, the method of at least one of clauses 1-8, further comprising: assigning a different color to each curve of the at least one curve, wherein providing the at least one curve overlaid on the graph for display comprises providing each curve of the at least one curve for display in a color assigned to the respective curve and on the display of the electronic device.

Clause 10, the method of at least one of clauses 1-9, further comprising: generating an offset curve, wherein the offset curve is indicative of the formation resistivity of a formation at the different distances from an offset wellbore; overlaying the offset curve on the graph; and providing the offset curve overlaid on the graph for display on the display of the electronic device.

Clause 11, the method of at least one of clauses 1-10, determining an amount of deviation between the offset curve and the at least one curve; determining a quality of the data based on the amount of deviation between the offset curve and the at least one curve; generating a notification that the quality of the data is unacceptable if the amount of deviation between the offset curve and the at least one curve is greater than a threshold deviation; and in response to generating the notification, providing the notification for display on the display of the electronic device.

Clause 12, the method of at least one of clauses 1-11, further comprising: generating a third curve indicative of an average of the resistivity measurements of the formation at the different distances from the wellbore; overlaying the third curve on a graph; and providing the third curve overlaid on the graph for display on the display of the electronic device.

Clause 13, a formation resistivity evaluation system, comprising: a machine-readable medium storing data obtained from a resistivity sensor deployed in a wellbore and indicative of resistivity measurements of a formation proximate the wellbore at different distances within a range of distances from the wellbore; and a processor operable to: analyze the data to determine approximate formation resistivity of the formation at the different distances from the wellbore; generate a first curve indicative of a first threshold of formation resistivity of the formation at the different distances from the wellbore; generate a second curve indicative of a second threshold of the formation resistivity of the formation at the different distances from the wellbore; overlay the first curve and the second curve on a graph indicative of the formation resistivity of the formation within the range of distances from the wellbore; and provide the first curve and the second curve overlaid on the graph for display on a display of an electronic device.

Clause 14, the system of clause 13, wherein the processor is further operable to: determine an amount of deviation between at least one curvature of the first curve and at least one curvature of the second curve; and determine a quality of the data based on the amount of deviation between the at least one curvature of the first curve and the at least one corresponding curvature of the second curve.

Clause 15, the drilling system of clause 13 or 14, wherein the processor is further operable to compare differences between curvatures of the first curve and the second curve to determine the amount of deviation between the first curve and the second curve.

Clause 16, the drilling system of at least one of clauses 13-15, wherein the processor is further operable to: determine, at a first point along the first curve, a first value of the formation resistivity at a first distance from the wellbore; determine, at a corresponding point along the second curve, a second value of the formation resistivity at the first distance from the wellbore; and compare the difference between the first value of the formation resistivity and the second value of the formation resistivity to determine the amount of deviation between the first curve and the second curve.

Clause 17, the drilling system of at least one of clauses 13-16, wherein the processor is further operable to: determine if the amount of deviation between the first curve and the second curve is greater than a threshold value; in response to a determination that the amount of deviation between the first curve and the second curve is greater than the threshold value, generate a notification that the quality of the data is unacceptable; and provide the notification for display on the display of the electronic device.

Clause 18, the drilling system of at least one of clauses 13-17, wherein the processor is further operable to: receive a first desired formation resistivity and a second desired formation resistivity; designate the first desired formation resistivity as the first threshold of the formation resistivity; and designate the second desired formation resistivity as the second threshold of the formation resistivity.

Clause 19, the drilling system of at least one of clauses 13-18, wherein the processor is further operable to: fill an area on the graph in between the first curve and the second curve with a first color; and provide the area in the first color for display on the display of the electronic device.

Clause 20, a machine-readable medium comprising instructions stored therein, which when executed by one or more processors, causes the one or more processors to perform operations comprising receiving, from a resistivity sensor deployed in a wellbore, data indicative of resistivity measurements of a formation proximate the wellbore at different distances within a range of distances from the wellbore; analyzing the data to determine approximate formation resistivity of the formation at the different distances from the wellbore; generating a first curve indicative of a first threshold of formation resistivity of the formation at the different distances from the wellbore; assigning a first color to the first curve; generating a second curve indicative of a second threshold of the formation resistivity of the formation at the different distances from the wellbore; assigning a second color to the second curve; overlaying the first curve and the second curve on a graph indicative of the formation resistivity of the formation within the range of distances from the wellbore; and providing the first curve and the second curve overlaid on the graph for display on a display of an electronic device, wherein the first curve is displayed in the first color, and wherein the second curve is displayed in the second color.

Although certain embodiments disclosed herein describes transmitting electrical currents from electrodes deployed on an inner string to electrodes deployed on an outer string, one of ordinary skill would understand that the subject technology disclosed herein may also be implemented to transmit electrical currents from electrodes deployed on the outer string to electrodes deployed on the inner string.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to evaluate formation resistivity, the method comprising:
receiving, from a resistivity sensor deployed in a wellbore, data indicative of resistivity measurements of a formation proximate the wellbore at different distances within a range of distances from the wellbore;
analyzing the data to determine approximate formation resistivity of the formation at the different distances from the wellbore;
generating at least one curve, each indicative of an approximate formation resistivity of the formation at the different distances from the wellbore, wherein generating the at least one curve comprises:
generating a first curve indicative of a first threshold of the formation resistivity; and
generating a second curve indicative of a second threshold of the formation resistivity;
overlaying the at least one curve on a graph indicative of the formation resistivity of the formation within the range of distances from the wellbore;
providing the at least one curve overlaid on the graph for display on a display of an electronic device;
filling an area on the graph in between the first curve and the second curve with a first color; and
providing the area having the first color for display on the display of the electronic device.

2. The method of claim 1, further comprising:
receiving a first desired formation resistivity and a second desired formation resistivity;
designating the first desired formation resistivity as the first threshold of the formation resistivity; and
designating the second desired formation resistivity as the second threshold of the formation resistivity.

3. The method of claim 1, further comprising:
assigning a different color to each curve of the at least one curve,
wherein providing the at least one curve overlaid on the graph comprises providing each curve of the at least one curve in a color assigned to the respective curve for display on the display of the electronic device.

4. The method of claim 1, further comprising:
generating a third curve indicative of an average of the resistivity measurements of the formation at the different distances from the wellbore;
overlaying the third curve on a graph; and
providing the third curve overlaid on the graph for display on the display of the electronic device.

5. The method of claim 1, further comprising:
determining an amount of deviation between the first curve and the second curve; and
determining a quality of the data based on the amount of deviation between the first curve and the second curve.

6. The method of claim 5, wherein determining the amount of deviation between the first curve and the second curve comprises comparing differences between at least one curvature of the first curve and at least one corresponding curvature of the second curve.

7. The method of claim 5, further comprising:
determining, at a first point along the first curve, a first value of the formation resistivity at a first distance from the wellbore; and
determining, at a corresponding point along the second curve, a second value of the formation resistivity at the first distance from the wellbore,
wherein determining the amount of deviation between the first curve and the second curve comprises determining a difference between the first value of the formation resistivity and the second value of the formation resistivity.

8. The method of claim 5, further comprising:
determining if the amount of deviation between the first curve and the second curve is greater than a deviation threshold;
in response to determining that the amount of deviation between the first curve and the second curve is greater than the deviation threshold, generating a notification that the quality of the data is unacceptable; and
providing the notification for display on the display of the electronic device.

9. The method of claim 1, further comprising:
generating an offset curve, wherein the offset curve is indicative of the formation resistivity of a formation at the different distances from an offset wellbore;
overlaying the offset curve on the graph; and
providing the offset curve overlaid on the graph for display on the display of the electronic device.

10. The method of claim 9, further comprising:
determining an amount of deviation between the offset curve and the at least one curve;
determining a quality of the data based on the amount of deviation between the offset curve and the at least one curve;
generating a notification that the quality of the data is unacceptable if the amount of deviation between the offset curve and the at least one curve is greater than a threshold deviation; and
in response to generating the notification, providing the notification for display on the display of the electronic device.

11. A formation resistivity evaluation system, comprising:
a machine-readable medium storing data obtained from a resistivity sensor deployed in a wellbore and indicative of resistivity measurements of a formation proximate the wellbore at different distances within a range of distances from the wellbore; and a processor operable to:
analyze the data to determine approximate formation resistivity of the formation at the different distances from the wellbore;
generate a first curve indicative of a first threshold of formation resistivity of the formation at the different distances from the wellbore;
generate a second curve indicative of a second threshold of the formation resistivity of the formation at the different distances from the wellbore;
overlay the first curve and the second curve on a graph indicative of the formation resistivity of the formation within the range of distances from the wellbore;
provide the first curve and the second curve overlaid on the graph for display on a display of an electronic device;
fill an area on the graph in between the first curve and the second curve with a first color; and
provide the area for display in the first color on the display of the electronic device.

12. The formation resistivity evaluation system of claim 11, wherein the processor is further operable to:
receive a first desired formation resistivity and a second desired formation resistivity;
designate the first desired formation resistivity as the first threshold of the formation resistivity; and
designate the second desired formation resistivity as the second threshold of the formation resistivity.

13. The formation resistivity evaluation system of claim 11, wherein the processor is further operable to:
determine an amount of deviation between at least one curvature of the first curve and at least one curvature of the second curve; and
determine a quality of the data based on the amount of deviation between the at least one curvature of the first curve and the at least one corresponding curvature of the second curve.

14. The formation resistivity evaluation system of claim 13, wherein the processor is further operable to compare differences between curvatures of the first curve and the second curve to determine the amount of deviation between the first curve and the second curve.

15. The formation resistivity evaluation system of claim 13, wherein the processor is further operable to:
determine, at a first point along the first curve, a first value of the formation resistivity at a first distance from the wellbore;
determine, at a corresponding point along the second curve, a second value of the formation resistivity at the first distance from the wellbore; and
compare the difference between the first value of the formation resistivity and the second value of the formation resistivity to determine the amount of deviation between the first curve and the second curve.

16. The formation resistivity evaluation system of claim 13, wherein the processor is further operable to:
determine if the amount of deviation between the first curve and the second curve is greater than a threshold value;
in response to a determination that the amount of deviation between the first curve and the second curve is greater than the threshold value, generate a notification that the quality of the data is unacceptable; and
provide the notification for display on the display of the electronic device.

17. A machine-readable medium comprising instructions stored therein, which when executed by one or more processors, causes the one or more processors to perform operations comprising:
- receiving, from a resistivity sensor deployed in a wellbore, data indicative of resistivity measurements of a formation proximate the wellbore at different distances within a range of distances from the wellbore;
- analyzing the data to determine approximate formation resistivity of the formation at the different distances from the wellbore;
- generating a first curve indicative of a first threshold of formation resistivity of the formation at the different distances from the wellbore;
- assigning a first color to the first curve;
- generating a second curve indicative of a second threshold of the formation resistivity of the formation at the different distances from the wellbore;
- assigning a second color to the second curve;
- overlaying the first curve and the second curve on a graph indicative of the formation resistivity of the formation within the range of distances from the wellbore;
- providing the first curve and the second curve overlaid on the graph for display on a display of an electronic device, wherein the first curve is displayed in the first color, and wherein the second curve is displayed in the second color;
- filling an area on the graph in between the first curve and the second curve with a first color; and
- providing the area for display in the first color on the display of the electronic device.

* * * * *